Aug. 22, 1961  W. C. SCHMIDT  2,997,087
SINGLE BLADE KNIFE WITH ARCUATE NOTCHED BLADE TIP
Filed Sept. 9, 1958
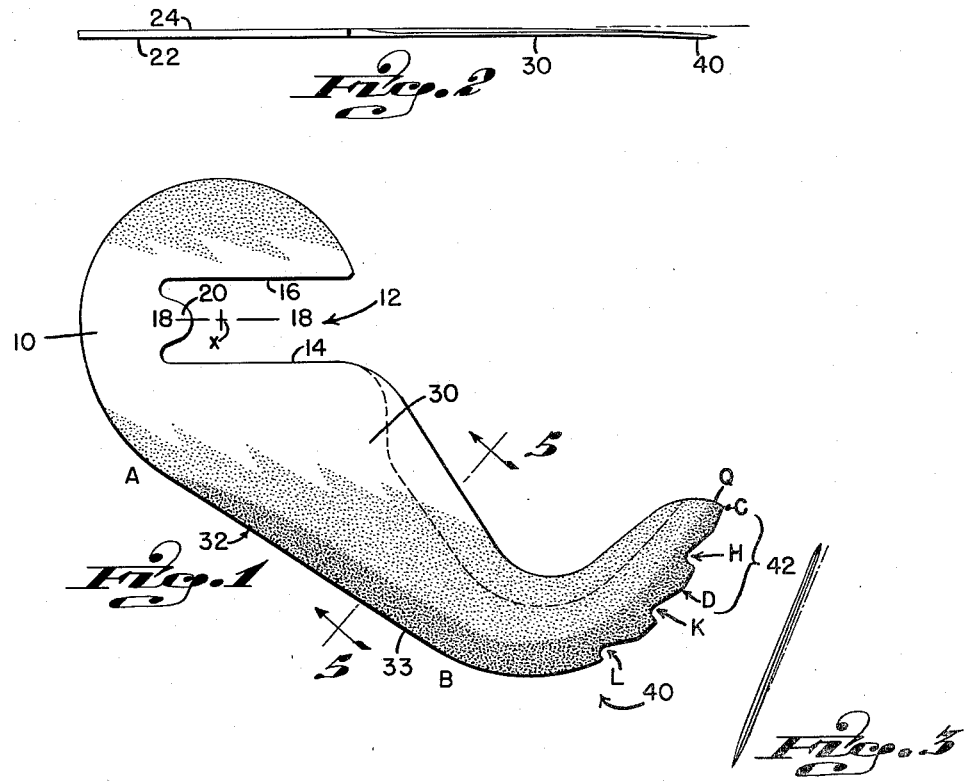
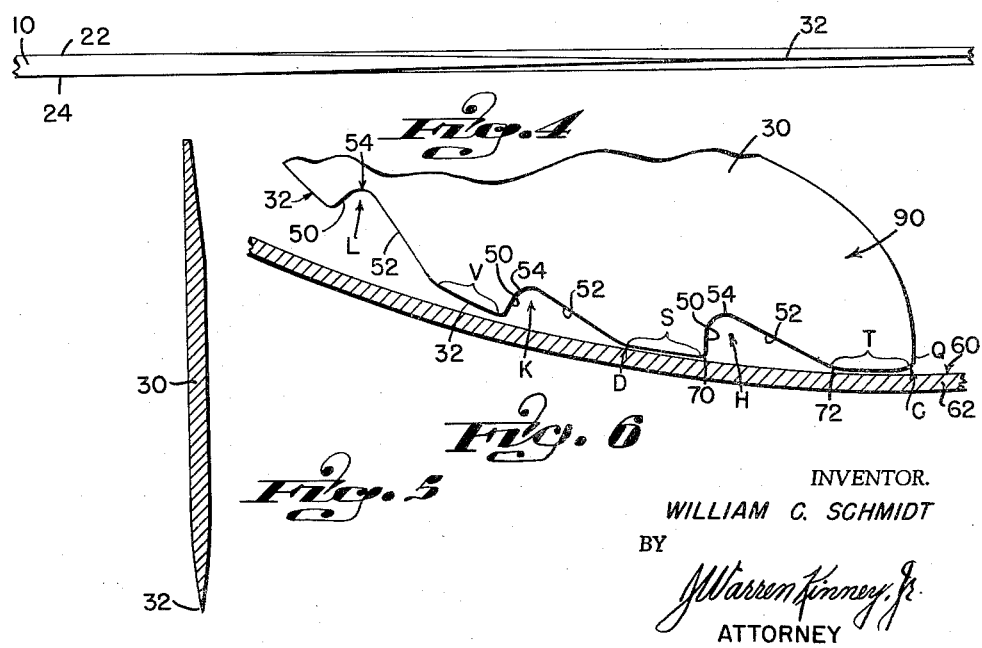
INVENTOR.
WILLIAM C. SCHMIDT
BY
J. Warren Kinney Jr.
ATTORNEY

United States Patent Office 2,997,087
Patented Aug. 22, 1961

2,997,087
SINGLE BLADE KNIFE WITH ARCUATE NOTCHED BLADE TIP
William C. Schmidt, Cincinnati, Ohio, assignor to The Cincinnati Butchers Supply Company, Cincinnati, Ohio, a corporation of Ohio
Filed Sept. 9, 1958, Ser. No. 759,896
7 Claims. (Cl. 146—106)

This invention relates to cutter knives, and more particularly to knives for commercial meat cutting, chopping, and mixing machines.

An object of the invention is to provide a cutting knife blade having a notched cutting tip for greatly enhancing the overall efficiency of the knife.

Another object of the invention is to provide a cutter knife having a single cutting blade which terminates in an arcuate cutting portion which is provided with a series of notches which effectively prevent the products being cut from adhering to the cutter bowl.

A further object of the invention is to provide a knife having the hereinabove described characteristics in which the cutting tip is displaced with reference to the hub as to impart an angular, drag-free cutting action to the product being cut while the product is continuously advanced toward and to the blade.

Another object of the invention is to provide a notched cutting knife which is adapted to co-operate with the circular bowl of a commercial cutting machine whereby to thoroughly agitate and cut the meat fibres which in the prior art devices were not cut by reason of the tendency of the meat products to adhere to the bowl under the knives.

Still a further object of the invention is to provide a knife for a meat cutting machine, which knife terminates in a sharpened arcuate tip having a series of spaced notches provided therealong, wherein the shape and relationship of notches is such as to result in the meat fibres being literally crushed and cut as the blade tip is moved relative to the bowl of the cutting machine.

These and other objects are attained by the means described herein and as disclosed in the accompanying drawings, in which:

FIG. 1 is a plan view of a knife embodying the teachings of the present invention.

FIG. 2 is a top edge view thereof.

FIG. 3 is an end view of the blade tip.

FIG. 4 is an enlarged partial bottom edge view of the knife of FIG. 1 between points A and B.

FIG. 5 is an enlarged sectional view taken on line 5—5 of FIG. 1.

FIG. 6 is an enlarged, fragmentary view, partly in section, illustrating the relationship between the arcuate, notched tip of the knife of FIG. 1 with the inner face of the circular bowl of a typical meat cutting machine.

With particular reference now to FIG. 1, it will be observed that the cutter knife comprises a hub or mounting member 10 in the form of a friction plate having therein a slot 12 bounded by a pair of spaced, parallel edges 14 and 16 which are equi-distant from the longitudinal axis 18—18 of the slot. An abutment or tongue 20 is disposed in the end of slot 12, it being understood that the dimensional characteristics of mounting slot 12 are such as to facilitate association of the knife with flattened portions of the cutting shaft of a commercial meat chopping machine, such as, by way of example, is more fully illustrated in U.S. Patent No. 2,635,663 and my patent application S. N. 594,283 filed June 27, 1956, now United States Patent No. 2,864,420.

The hub 10 is provided with flat, smooth, even, parallel opposite axial faces 22 and 24, FIG. 2, wherein the latter spacing between said faces represents the maximum thickness of the knife.

A blade portion indicated generally by the numeral 30 is formed integral with and extends from hub 10, said blade having a sharpened lower blade edge 32 which extends forwardly from a location approximately below center X of the hub. The blade terminates in a tip Q at the forward end of an arcuate portion 40 which includes a radial portion 42 indicated in FIG. 1 by the distance between points C and D. Portion 42 of the arcuate portion 40 has been referred to as a radial portion since the cutting edge between points C and D are located on an arc having its center at X. The blade edge of the arcuate portion 40 between points B and D curves inwardly from radial point D to the straight portion 33 between points A and B.

Uniformly satisfactory results have been obtained when the straight portion 33 of the blade edge is inclined from 20° to 50° relative to axis 18—18 of slot 12 of the hub.

With particular reference now to FIGS. 1 and 6, it will be noted that notches H, K and L have been provided in the arcuate portion, wherein notch H is disposed entirely within radial portion 42 between points C and D, and wherein notches K and L are spaced along the arcuate portion 40 rearwardly of, or remote from, the radial portion.

Each of the notches faces the blade tip Q, that is, the forward wall 50 of each of the notches is substantially normal to the cutting edge of the blade and in advance of inclined portions 52 which tapers toward the tip from the point 54 of maximum notch depth out to cutting edge 32.

As illustrated in FIG. 6, the notched construction of the arcuate portion of the blade results in a pair of laterally spaced, radial cutting edges S and T, which are disposed in close but spaced relationship with inner face 60 of bowl 62 of a commercial cutting machine. In actual practice, radial portions S and T are preferably spaced approximately 1/64 of an inch from bowl face 60. The provision of notch H between the radial cutting edges S and T provides a chamber, or relief area into which the products being cut will be received and then be swept or propelled downwardly along inclined edge 52 of the notch toward blade edge 32. Incident to this action the toughest meat fibres will be simultaneously crushed and cut.

A similar action occurs at the other notches.

In the preferred embodiment of the invention, the continuous blade portions S, T and V intermediate adjoining notches are of a dimension at least one-half the overall length of notches H, K and L, wherein the overall length of a notch is measured between points 70 and 72 (FIG. 6).

With particular reference now to FIG. 2, it will be noted that the tip of the blade portion of the knife, toward the tapered end thereof, is deflected downwardly from a plane through axial face 24 of the hub.

It should be understood that bowl 62 is continuously rotated toward the reader, in FIG. 6, that the knife rotates in a clockwise direction, as indicated by the headed arrow 90, and that the blade tip is also deflected forwardly toward the reader so that the meat or other product to be cut is continuously fed toward that face of the blade away from the reader in FIGS. 1 and 6.

As best illustrated in FIG. 2, the blade tip may be deflected by an amount approximating half the hub thickness between axial faces 22 and 24. Such an amount of deflection will practically reduce side pressure on the rear face of the knife in those instances wherein the bowl is rotated at about 12 r.p.m. and the cutter knives at 1800 r.p.m. Such axial deflection results in a side-sweep action of the blade in addition to its end cutting action, and the combination of the side sweeping and end cutting action further enhances the overall efficiency of the knife.

What is claimed is:

1. A knife for a meat cutting machine comprising a hub having a blade extending therefrom, said hub having a notch therein defined between opposed parallel faces of the hub and adapted to receive the shaft of a meat cutting machine whereby the knife is rotated about an axis passing through said notch, said blade terminating remote from the hub in an arcuate edge provided with a plurality of spaced notches therealong, the portions of said edge between said notches being sharpened and the extremity of said edge being arcuated along an arc having its center at said axis of rotation of the knife, the remaining portion of said arcuate edge including at least one of said notches being arcuated along a constantly decreasing radius so as to sweep away from the line of curvature of said extremity, whereby a progressive cutting action is achieved by said knife.

2. The assembly as defined in claim 1 wherein said blade is angulated with respect to said hub at an angle from between 20° to 50° with respect to the axis of the hub notch.

3. The assembly as defined in claim 1 wherein each of the blade notches faces in the direction of the extremity of the edge such that portions of the notches slope downwardly towards the cutting portions of the blade to effect a shredding and crushing action on the meat disposed therewithin.

4. A knife for a meat cutting machine comprising a hub provided with a notch defined between opposed substantially parallel faces extending inwardly of the hub and adapted to receive the shaft of a meat cutting machine for rotation therewith about an axis contained at a fixed point within the notch and perpendicular to the hub, a blade integral with said hub and extending therefrom to terminate in a hooked end portion whereby the blade is of generally L-shaped configuration, said blade extending from said hub at an angle of from between 20° to 50° to the parallel faces of the hub defining the notch therein, the outer side of the hooked end portion of said blade having a portion of its extremity lying along a line of curvature which is uniformly radially spaced from the axis of rotation of the knife and being provided therein with at least one notch dividing such portion into a pair of cutting edges, said cutting edges being sharpened, the remaining portion of said hooked end portion of the blade extending along a line of curvature of constantly decreasing radius from the aforementioned portion of constant radius to merge smoothly with the outer side of said blade and containing at least one notch defining a further sharpened cutting edge which is offset radially inwardly with respect to the line of curvature of the first mentioned cutting edges whereby to effect a progressive cutting action on meat acted upon by the knife.

5. The assembly as defined in claim 4 wherein the notches in the blade face the extremity of the hooked end portion thereof and slope on one side toward such extremity to effect a crushing and shredding action on meat disposed within the notches.

6. A knife for a meat cutting machine comprising a hub having a blade extending therefrom, said hub having a notch formed therein and being adapted to be rotated about an axis passing through said notch, said blade including an arcuate cutting edge portion and terminating in a tip, said arcuate edge portion having a plurality of notches formed therein and said arcuate portion including a radial portion lying substantially along an arc the center of which is located at said axis, each of said notches facing toward said tip such that the forward wall of each notch is substantially normal to the cutting edge of the blade and the rearward wall of each notch slopes toward said tip from the point of maximum notch depth out to said arcuate cutting edge.

7. Apparatus as defined in claim 6, wherein said hub includes parallel front and rear axial faces, said arcuate portion projecting forwardly from a plane through the front axial face of said hub.

References Cited in the file of this patent

UNITED STATES PATENTS

| 2,864,420 | Schmidt | Dec. 16, 1958 |

FOREIGN PATENTS

| 131,092 | Switzerland | Apr. 16, 1929 |
| 525,145 | Germany | May 20, 1931 |